United States Patent [19]

Sloan et al.

[11] 4,322,614
[45] Mar. 30, 1982

[54] TICKET READER

[75] Inventors: Donald A. Sloan, Winston-Salem; Carroll G. Perkins, Pilot Mountain, both of N.C.

[73] Assignee: Consolidated Foods Corporation, Winston-Salem, N.C.

[21] Appl. No.: 109,479

[22] Filed: Jan. 4, 1980

[51] Int. Cl.³ ............................................. G06K 7/10
[52] U.S. Cl. .................................. 235/458; 235/474; 235/475
[58] Field of Search ......................... 235/458, 474, 475

[56] References Cited

U.S. PATENT DOCUMENTS

| 1,826,992 | 10/1931 | Carroll | 235/475 |
| 2,098,305 | 11/1937 | Nichols | 235/475 |
| 2,848,535 | 8/1958 | Hunt, Jr. | 235/474 |
| 2,980,319 | 4/1961 | Clemens et al. | 234/30 |
| 3,018,947 | 1/1962 | Harruff et al. | 234/30 |
| 3,036,764 | 5/1962 | Braun et al. | 235/445 |
| 3,105,814 | 10/1963 | Angus | 235/447 |
| 3,182,992 | 5/1965 | Braun | 271/3 |
| 3,324,284 | 6/1967 | Wockenfuss | 235/474 |
| 4,055,747 | 10/1977 | Jensen | 235/458 |
| 4,114,028 | 9/1978 | Baio | 235/458 |
| 4,145,606 | 3/1979 | Auchinleck et al. | 235/477 |
| 4,196,349 | 4/1980 | Yamada | 235/474 |

Primary Examiner—Harold I. Pitts
Attorney, Agent, or Firm—Charles Y. Lackey; William S. Burden

[57] ABSTRACT

A lightweight, portable apparatus for rapidly reading continuously and sequentially a plurality of ticket records having specific data encoded thereon as the tickets are removed individually from a supply magazine and conveyed along a prescribed path by a ticket feed assembly, an escapement assembly and a transport drive wheel to a ticket data sensing station. Data encoded on each advancing ticket is read in timed relation with displacement of a ticket advancing through the apparatus by control means and transmitted to equipment for storing and/or reproducing of the data in another form.

9 Claims, 21 Drawing Figures

TICKET READER

BRIEF SUMMARY AND OBJECTS OF THE INVENTION

This invention related generally to an apparatus for sensing data bearing records, and more particularly to a portable, lightweight apparatus for feeding, sensing and selectively recording data encoded on records such as perforated tags or tickets.

The perforated tickets normally are attached to merchandise or like articles and are provided with data indications thereon. For example, when the tickets are provided on apparel, the coded data may disclose information such as the size, color, style, cost, etc. of garments. Usually, upon sale of the garments, the tickets, or portions thereof, are removed and sent to a data processing area having equipment to read the data upon the tickets and transmit the data to equipment for storing the data and/or reproducing the data into another form.

Basically, a series of tickets are stacked in superposed relation within a magazine of the portable apparatus. In one embodiment the tickets are removed sequentially from the magazine by a bladed rotating shaft which directs the tickets in a first direction. A ticket pusher blade reverses the movement of the tickets and ticket drive openings are engaged by drive lugs positioned at the periphery of a transport wheel for displacement along a prescribed path. In an alternate embodiment, a blade pushes the lowermost ticket from the stack into a ticket receiver, and the receiver is angularly displaced to tilt the ticket downwardly for engagement by the transport wheel drive lugs.

Data is gathered from each ticket as it passes between an array of ten phototransistors and their respective light sources. As a ticket passes through, the light paths are broken except where the data holes exist. The data holes present themselves as light pulses to the phototransistors which convert them to electrical pulses for interpretation by a micro-computer. A strobe wheel encoder device permits receiving only valid data from the openings in the ticket.

One of the primary objects of the invention is a provision of a new and improved lightweight portable apparatus for rapidly sensing and recording data encoded on perforated records or tickets.

Another object of the invention is the provision of an improved record handling apparatus which is efficient, compact and relatively inexpensive to manufacture and maintain.

It is a further object of the invention to provide a perforated ticket reader apparatus having a unique transport system for continuously feeding sequentially tickets from a magazine to a sensing station.

Yet another object of the invention is to provide a novel ticket data sensing system.

Other objects and advantages of the invention will become apparent from the following description of one embodiment thereof when taken in conjunction with the accompanying drawing.

DETAILED DESCRIPTION OF THE INVENTION

Referring to the drawing, and particularly to FIGS. 1-15, the ticket reader will be described in the application of feeding merchandise tickets and reading perforated data on the tickets.

The apparatus 20 includes a lightweight, portable chassis or frame 22 supporting a ticket magazine 24, a ticket transport assembly 26, a ticket sensor assembly 28, a guide mechanism 30, a logic board 32, and a power supply package 34.

Figures 3, 5, 13:
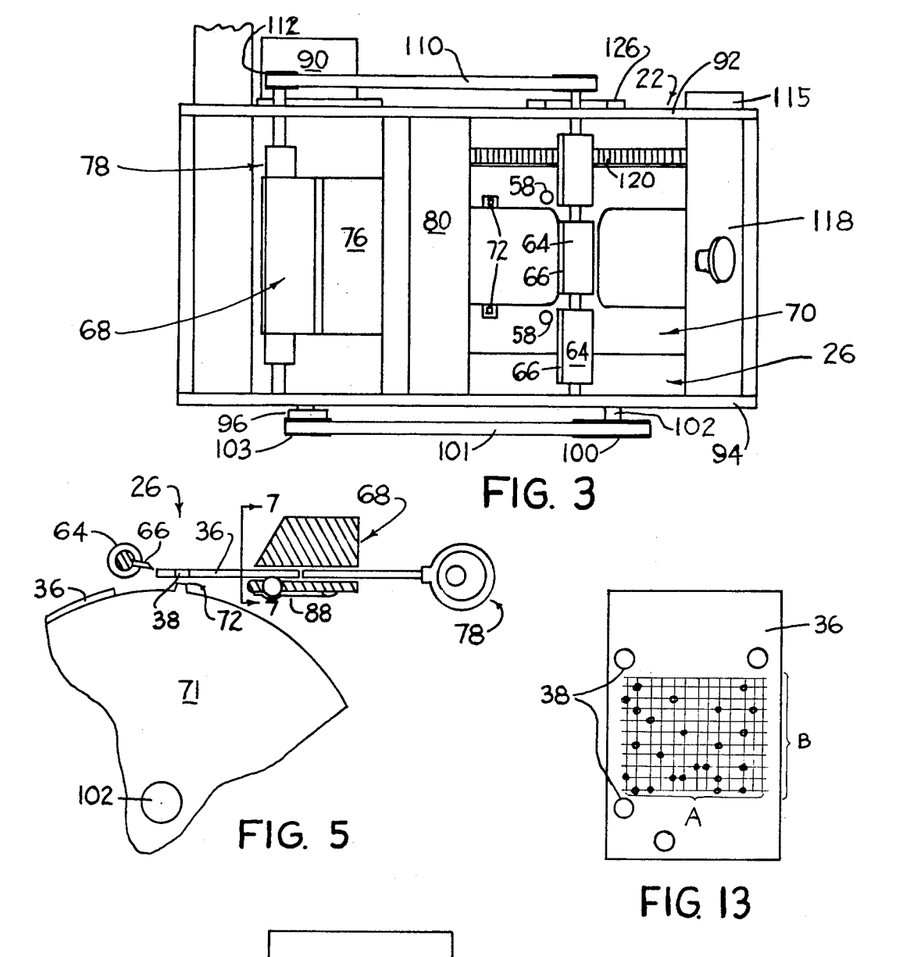
FIG. 3 is a schematic, fragmentary, top plan view of the apparatus of FIGS. 1 and 2.
FIG. 5 is a fragmentary view, similar to FIG. 4, illustrating the ticket pusher blade moved to the rearmost position.
FIG. 13 is an illustration of a typical perforated ticket.

As shown by way of example, a ticket 36, FIG. 13, is provided with perforated data arranged in a prescribed manner in twelve columns A, with each column having ten possible perforated positions B, each column divided along the ticket centerline into left and right half rows, as will be subsequently described with respect to FIG. 15. The ticket also is provided with two relatively large diameter openings 38 which facilitate alignment and feeding of tickets through the apparatus.

The ticket magazine 24 includes a vertically disposed frame 40 supported by the frame 22 and having a pair of spaced, parallel alignment pins 42. A rod 44, having a knob 46 at the upper end, extends through sleeve 48 and an opening, not shown, provided in the frame 40 and is spring biased downwardly such that the pin 50 extending horizontally through the rod 44 is urged into engagement with selected portions of the upper cam surface of sleeve 48. The pin 50 retains a wicket 52 in position upon frame 40 with the arcuate section 54 partially extending around sleeve 48 and with openings 56 receiving the alignment pins 42. A series of tickets, which may be within the range of 250-350 tickets, are positioned upon the wicket rods 58 with the rods passing through the ticket openings 38. A weight 60 is slidably positioned upon rods 58 and urges the tickets 36 downwardly. It is to be noted that the lowermost portions 41 of the frame 40 are angled or cammed slightly adjacent the lower ends of rods 58 for urging the lowermost tickets to the right, FIG. 4.

Figure 4:
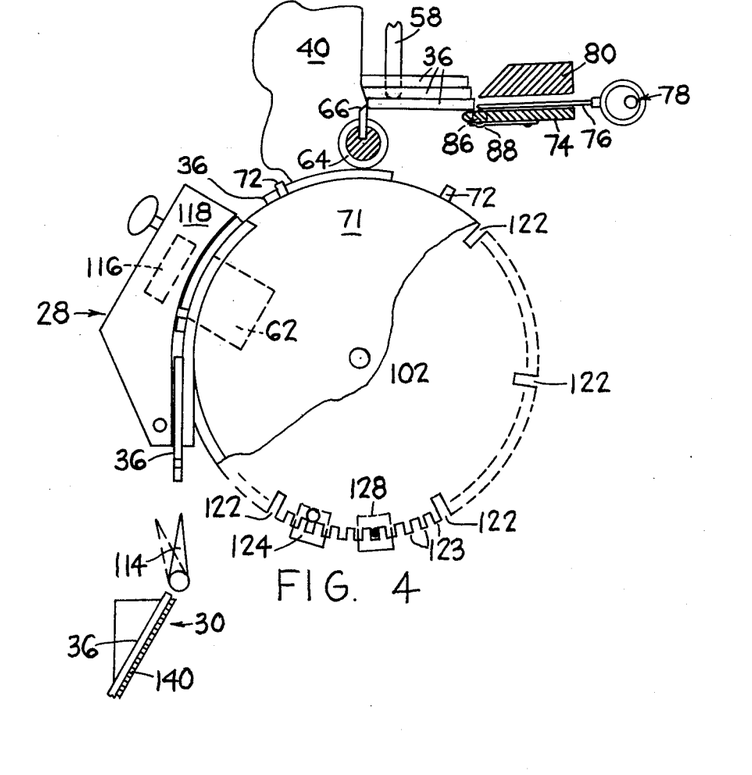
FIG. 4 is an enlarged, fragmentary, side elevational view illustrating the apparatus for conveying the tickets through the apparatus.
Figure 6:
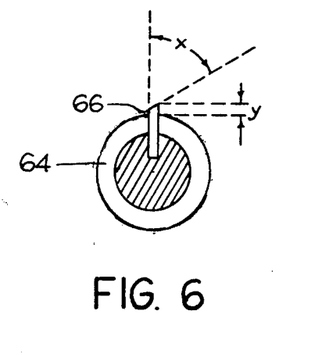
FIG. 6 is an enlarged, sectional view of the bladed feed shaft.
Figure 7:
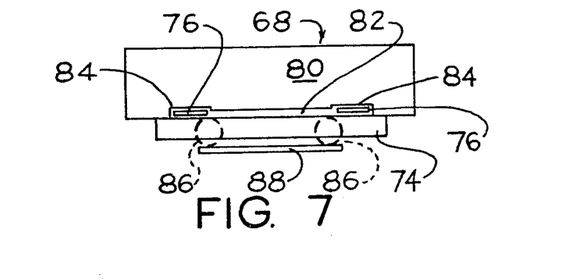
FIG. 7 is an elevational view of the aperture block, ticker pusher blade, ball detents and ticket stop taken along line 7—7 of FIG. 5.
Figure 8:
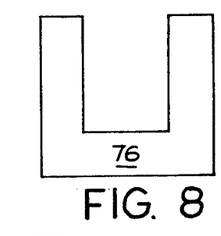
FIG. 8 is a top plan view of the ticket pusher blade.

In the embodiment of FIGS. 1-15, the ticket transport assembly 26 sequentially moves tickets one at a time from the magazine 24 and carries the tickets to a perforated data read head 62 of the sensor assembly 28. The transport assembly 26 includes a feed shaft 64 having a blade 66 extending parallel with the axis of shaft 64 and extending radially outwardly beyond the outer periphery of the shaft a distance y, FIG. 6, which preferably is approximately equal to but less than the thickness of a ticket 36. Note that the lowermost ticket 36 rests partially upon the feed shaft 64 for engagement by the blade 66 of feed shaft 64 while the opposite end of the ticket is supported upon a stop 74 which forms a part of an escapement mechanism 68. Referring to FIGS. 4, 7, and 8, the mechanism 68 also includes a bifurcated nylon pusher blade 76 driven by the cranking motion of an eccentric shaft 78 and a block 80 positioned above the stop 74 and provided with a central slotted or recessed portion 82 and spaced slots 84 having a depth greater than the portion 82 for slidably receiving the spaced projecting portions of the pusher blade 76. The depth of the central recess 82 is approximately one and one/half times the thickness of ticket 36. Each of the slots 84 has a greater depth for readily receiving tickets having roughened or mutilated corner portions. Ball detents 86 are positioned within openings in the ticket stop 74 and are biased upwardly towards block 80 by a spring 88 which is attached by a conventional fastener adjacent one end of the ticket stop 74.

The transport assembly also includes a transport wheel or spool 70 having spaced flanges 71 provided with drive lugs 72 accurately positioned to engage the drive opening 38 of the tickets. While the number of pairs of drive lugs on the two flanges may vary, depending upon the size of the tickets, the diameter of the transport wheel, etc., in the embodiment illustrated, eight pairs of lugs 72 are equally spaced around the outer peripheries of the flanges. The wicket rods 58 must align precisely with the lugs 72 of the transport wheel 70 such that the lugs enter the ticket drive openings 38 to convey the tickets past the read head 62. As the transport wheel continues to rotate, the tickets are diverted to selected locations, as will be subsequently described.

Figure 1:
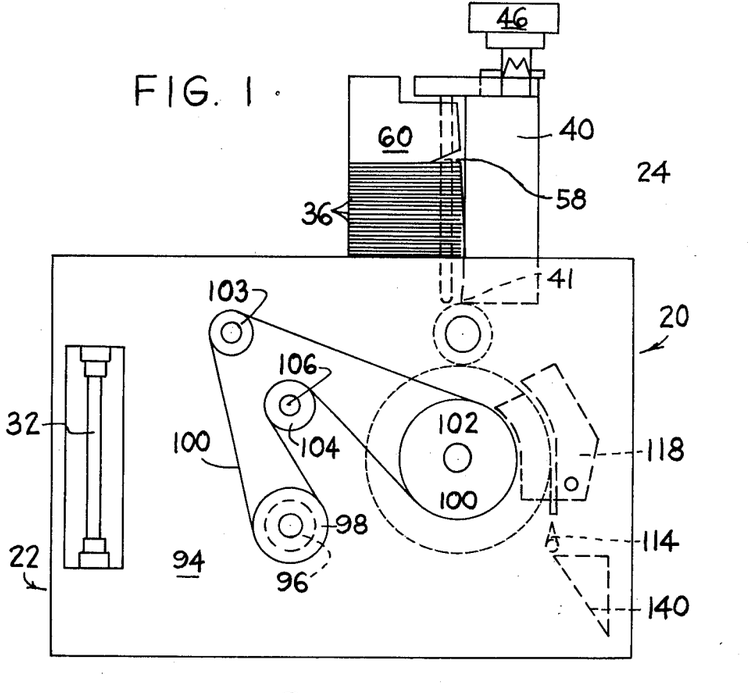
FIG. 1 is a schematic, side elevational view of the ticket reader of the present invention.
Figure 2:
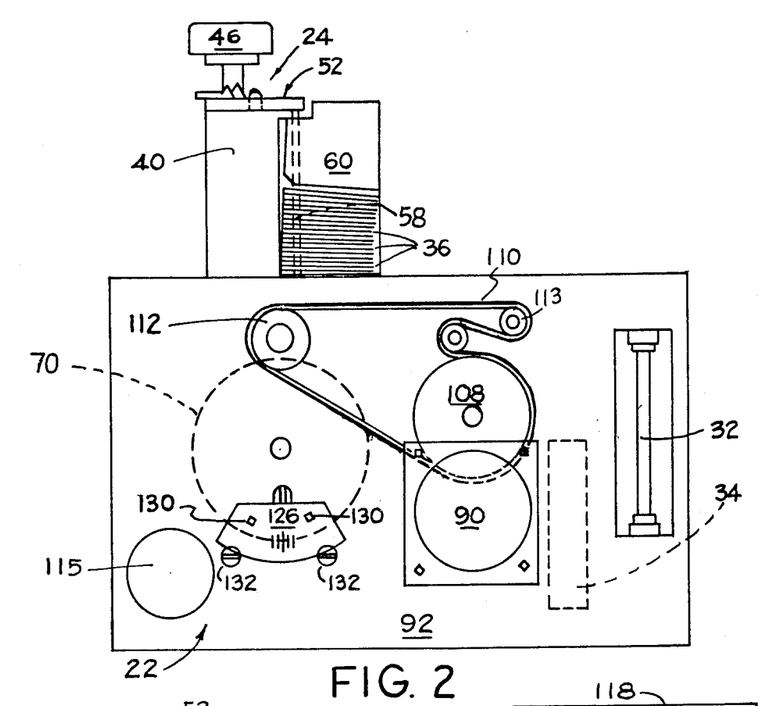
FIG. 2 is a schematic, side elevational view of the ticket reader opposite to that of FIG. 1.

A motor 90 drives the transport wheel 70, the bladed feed shaft 64 and the eccentric shaft 78. The drive motor is mounted upon a side frame 92 of chassis 22 and drives a shaft (not shown) which extends through the ticket reader apparatus and outwardly of side frame 94 where it is coupled to an overload release clutch 96 having a gear 98 attached thereto. In turn, the gear 98 drives, through a belt 101, the gear 100 and shaft 102, which has the transport wheel 70 secured for rotation therewith. The belt 101 passes over an idler 103 and a gear 104, FIG. 1, which is secured to a shaft 106 supported by the frames 92, 94. A gear 108, FIG. 2, is attached to the shaft 106 adjacent frame 92 and drives a belt 110 which, in turn, drives the feed shaft 64 through a gear 112 and rotates the eccentric shaft 78 through a gear 113.

The transport wheel 70, ticket feed shaft 64 and the eccentric shaft and pusher blade 76 must operate in a definite timed relationship with each other for proper ticket feeding. The eccentric shaft 78 is driven at a 2:1 ratio relative to the feed shaft 64, and the feed shaft 64 makes eight revolutions for each revolution of the transport wheel. With the blade 66 of the feed shaft 64 at top dead center, FIG. 4, at first contact with the lowermost ticket 36 to be fed, the pusher blade 76 is in the forward or fully extended position completely filling the slots 84 and the block 80. As the blade of the ticket feed shaft moves the edge of the ticket to the FIG. 5 position, the eccentric shaft 78 also moves the pusher blade 76 to the retracted position. As a ticket crosses the horizontal center line of the feed shaft it losses contact with the blade 66 and is pushed forward by the pusher blade 76. The drive lugs 72 of the rotating transport wheel are in timed relation with the movement of the ticket such that the lugs enter the ticket drive openings 38 as a ticket starts to pass underneath the feed shaft. After passing the read head 62, the tickets are directed by a stack gate 114 of the guide mechanism 30 to a selected location. The position of the gate 114 is controlled by a rotary solenoid 115 as will be subsequently described.

Figure 9:
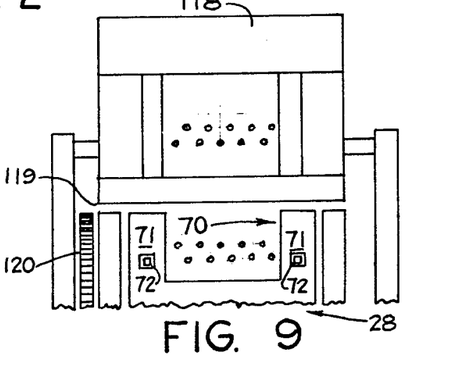
FIG. 9 is a schematic, fragmentary, top plan view of the apparatus with the access door opened and illustrating the arrangement of the light sources and read head sensors.
Figure 10:
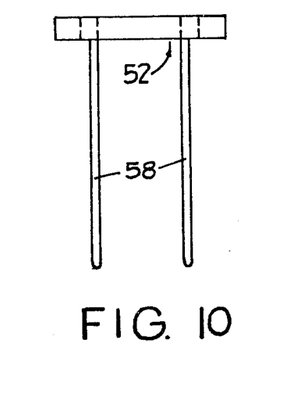
FIG. 10 is a side elevational view of the wicket assembly.
Figure 11:
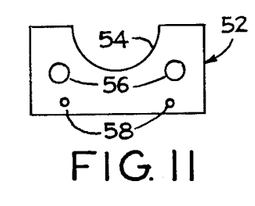
FIG. 11 is a top plan view of the wicket assembly of FIG. 10.
Figure 12:
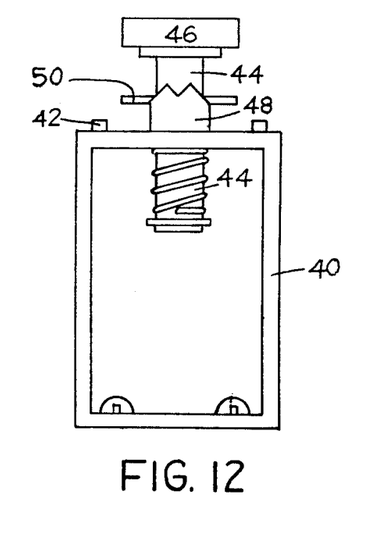
FIG. 12 is an end elevational view of the wicket holder.
Figure 15:
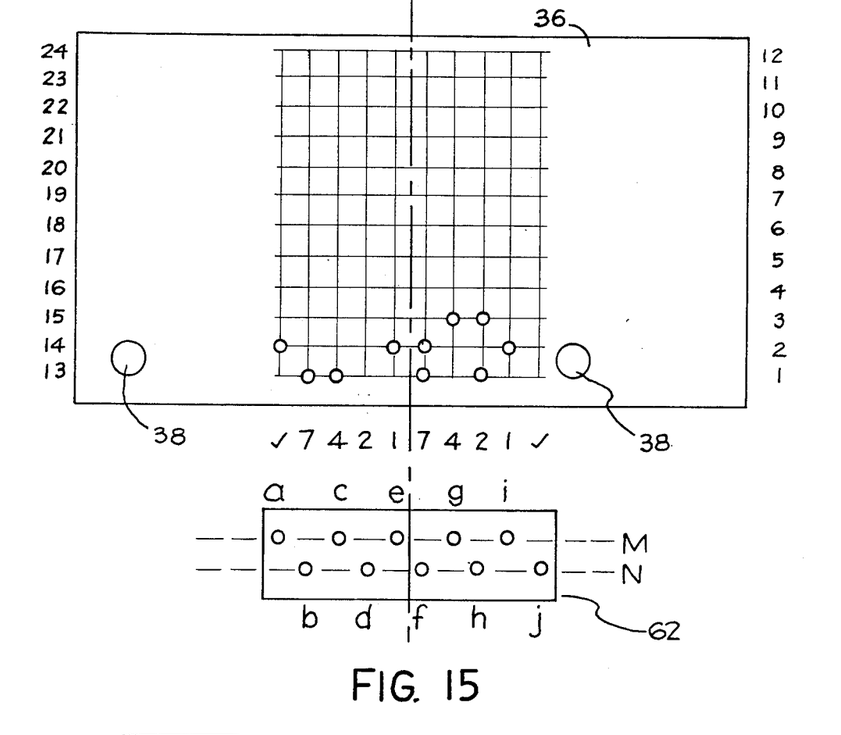
FIG. 15 is a schematic, fragmentary representation of the read head and aperforated ticket.

The sensor assembly 28 includes a light source 116 comprising an array of IRED's located within an access door 118, FIGS. 4 and 9, a read head 62 supported by member 119 and including an array of ten phototransistors a-j, FIG. 15. Phototransistors a, c, e, g, i are arranged in column M and phototransistors b, d, f, h, j are arranged in column N. The pattern of the openings in access door 118 communicating with the ten IRED's matches the pattern of the openings in member 119 which communicate with the ten phototransistors, as shown by FIG. 9. The read head 62 is coupled to the microcomputer 32 and as the data holes in the ticket present themselves as light pulses to the phototransistors, the phototransistors convert the light pulses to electrical pulses for interpretation by the microcomputer 32. Since there are times when no data holes are present; that is, between tickets, at ticket borders, or between data holes of a ticket, selective reading is required in order to retrieve only valid data from the holes in the tickets. This is accomplished by using a strobe wheel 120, FIG. 4.

The strobe wheel 120 is divided into eight segments, similar to the segments of the transport wheel 70 defined by the pairs of drive lugs, and is secured to the shaft 102 for rotation with wheel 70. Preferably the strobe wheel is a thin gear having a diameter substantially corresponding to the diameter of the transport wheel. Eight radially extending, equally spaced slots 122 are cut into the strobe wheel around the outer periphery, and approximately eighteen gear teeth 123 are provided between adjacent slots. A first sensor 124 is supported upon a plate 126 in a position to detect only the slots 122 as the strobe wheel rotates, and a sensor 128 also is positioned upon plate 126 to sense the spaces between the teeth 123 of the strobe wheel. The plate includes fasteners 130 for individually supporting sensors 124, 128 and is adjustably mounted upon the frame 22 by means of fasteners 132. The sensor 124 generates timing pulses derived from the strobe wheel 120 which track the movement of tickets between the light source and the read head 62.

As a slot 122 in the rotating strobe wheel 120 is detected by sensor 124, a signal is transmitted to the micro-computer 32. The strobe wheel has eighteen teeth between slots 122 and upon rotation, pulses, one for each tooth, are transmitted by sensor 128 to the microcomputer 32 which is set into condition by each pulse. In response to the timing pulses from the sensor 28 the micro-computer receives information detected by the read head 62 as the twelve columns A of data, corresponding to the first thirteen teeth after each slot 122 of the strobe wheel pass the read head. A column of data on the ticket 36 is read by the two staggered columns M, N, FIG. 15, of phototransistors a-j of the read head 62. The first column reads half the data then the second column reads the other half of the data. Referring to FIG. 15, for example, as half rows 1 and 13 of the ticket move into alignment with column M of the sensor head, the strobe wheel 120 signals the microprocessor 32 to accept data from column M. At that instant, no holes of row 1 match the sensors of column M, so no data is stored for row 1. However, sensor "c" of column M received a (4) from row 13 and stored it.

As the ticket advances, half rows 1 and 13 align with column N while half rows 2 and 14 align with column M of the sensor head. The strobe wheel instructs the microprocessor to accept data from column M and column N. For row 1, sensors f and h record a (7) and a (2) respectively and logically combine them for a (9). At the same time, sensor b is recording a (7) of row 13. That (7) plus the (4) in storage from sensor column M earlier, gives a (0) when logically ored. Therefore, the first digit of the 24 digit number will be a (9), and the 13th will be a (0). All other digits are determined in the same manner. During the movement of approximately the next five teeth past the sensor 28 the data, if valid, is transmitted to a computer 136 and the next slot 22 of the rotating strobe wheel 120 is ready to be detected by the sensor 124.

Provided the ticket data appears to be valid, the stack gate 114 remains in the FIG. 4 position and the ticket is deflected down the guide chute 140 and outwardly of the frame 22 to a receptacle, if desired. If the data on the ticket is determined to be invalid, the micro-computer 32 activates, through the power supply 34, the rotary solenoid 115 which temporarily pivots the gate 114 to the left, FIG. 4, and the ticket is deflected inwardly of the frame 22.

Figure 14:
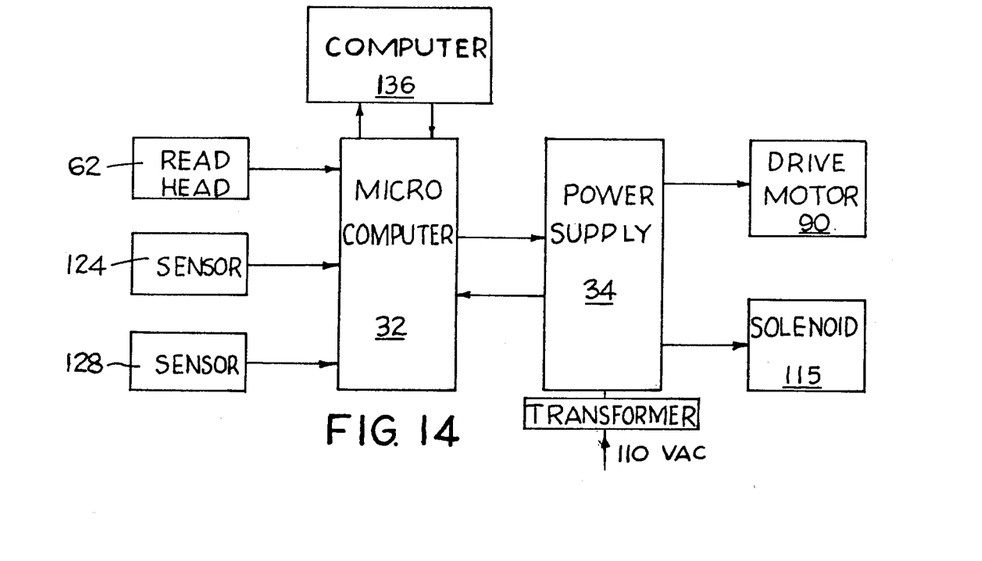
FIG. 14 is a schematic block diagram of the data control and motor circuitry of the present invention.

It is to be understood that various circuit arrangements can be designed to achieve the operations of the block diagram of FIG. 14.

In the operation of the apparatus, a plurality of tickets 36 are positioned upon the rods 58 of the wicket 52 and the wicket, in turn, is mounted upon the support 40 by lifting the handle 46 and pin 50 and positioning the wicket openings 56 over the alignment pins 42. The lowermost tickets are urged to the right, FIG. 4, with the bottom ticket having an edge resting upon the ticket stop 74.

As the shaft 64 rotates clockwise, the blade 66 moves behind the lower ticket at top dead center and moves the ticket to the right. The ticket moves to the right and into the slots 82, 84 of the aperture block 80. As the ticket progresses, the ball detents 86 are urged downwardly against springs 88, while at the same time the pusher blade 76 is retracting to the right due to the rotation of the eccentric shaft 78. The depth of the slot 82 is such that only one ticket can be admitted. As the lowermost ticket moves to the right, the frictional contact with the penultimate ticket tends to urge the penultimate ticket to the right. However, the depth of the slot in the aperture block permits only the lowermost ticket to move into the slot. At the FIG. 5 position, the blade 66 losses contact with the ticket within the aperture block 80, and the shaft 64 continues to rotate clockwise, the pusher blade moves to the left, FIG. 5, urging the ticket from the aperture. The speed of the ticket is approximately equal to the speed of the drive lug 72 and the end portion of the ticket is positioned such that the transport wheel lugs 72 enter the ticket drive openings 38 and advance the ticket beneath the feed shaft 64 and towards the read head 62. The feed shaft 64 and the access door 118 are provided with grooves or cutaway portions (see FIGS. 3 and 9) to receive the upstanding lugs 72 on the transport wheel 70.

All tickets are removed sequentially from the magazine and advanced in the manner previously described. In the particular embodiment illustrated eight tickets are conveyed past the read head 62 for each revolution of the transport wheel. As the tickets pass the read head, the code perforations are sensed and the sensed data is decoded and transmitted to the computer 136.

The location of the slots 122 on the strobe wheel 120 are in synchronized relation with the lugs 72 so that the sensor 124 detects a slot 122 just as ticket 36 progresses to the read head 62. Timing adjustments may be made by movement of the plate 126 which supports the sensor 124. The sensor 124 provides a signal to the micro-computer 32 and the sensor 128 sends signals to the microcomputer 32 sequentially as each tooth 123 of the strobe wheel is detected by the sensor subsequent to rotational movement of the slot 122 thereby. The microcomputer sequentially receives a series of pulses from the read head as each of the first thirteen teeth of the strobe wheel following a slot of 122 move past the read head. The space between the first thirteen teeth corresponds to the twelve columns of data encoded on the tickets 36.

The first column of data holes of the ticket, FIG. 13, is sensed by the read head, and the light paths from the light source 116 are selectively presented intermittently to the phototransistors which convert the pulses for interpretation by the computer. The strobe wheel gear teeth provide intermittent selective reading sequentially of each of the twelve columns of data on the ticket. Since approximately eighteen teeth are provided on the strobe wheel between adjacent slots 122, the five gear teeth, in addition to the above mentioned thirteen teeth, between adjacent drive lugs 72, provide a time period within which to send the read data from the micro-computer to the computer 136.

After passing the read head 62, the ticket is cammed outwardly from the drive lugs 72 by the outer peripheral wall of the member 119. Provided that the data sensed from the ticket is valid, the ticket is directed along a guide chute 140. If the sensed data is not valid, the stack gate 114 is pivoted to the dotted line position, FIG. 4, and the ticket is directed to another location. The drive motor 90 as well as the feed shaft 64, eccentric shaft 78, strobe wheel and transport wheel rotate continuously to sequentially read the tickets as they pass from the magazine and over the read head. In the present embodiment, the apparatus operates at a speed to continuously read data at the rate of approximately 300 tickets per minute.

A plurality of ticket readers may be arranged to transmit data sensed from the tickets to a common computer 136 if desired.

Figure 16:
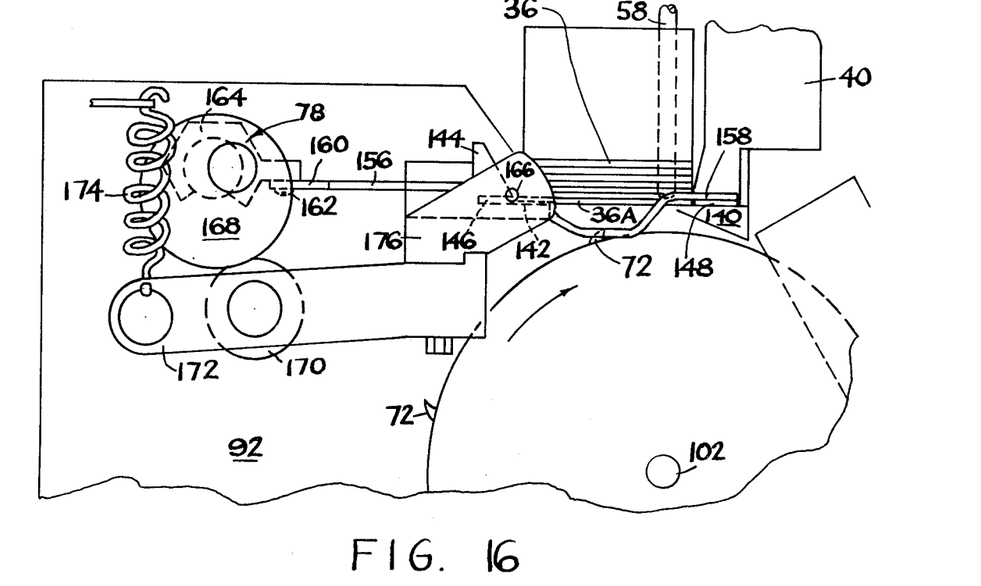
FIG. 16 is a fragmentary, side elevational view of the ticket reader illustrating a modified ticket feeding arrangement.
Figure 17:
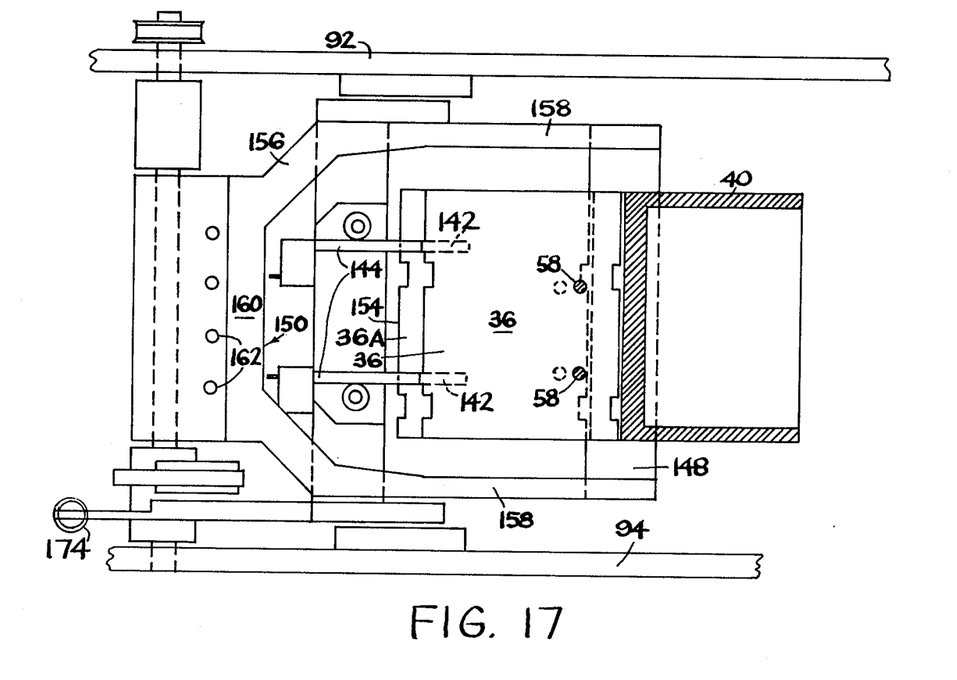
FIG. 17 is a fragmentary, top plan view of the apparatus of FIG. 16 illustrating the modified feed arrangement.
Figure 18:
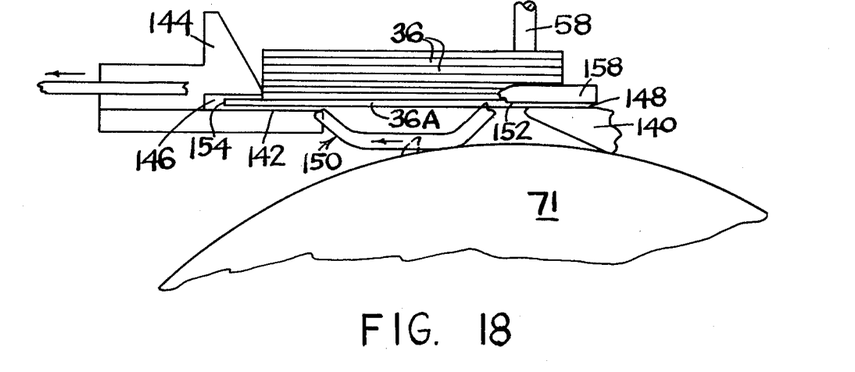
FIG. 18 is a fragmentary, side elevational view of the apparatus illustrating the movement of the pusher blade for urging the lowermost ticket into the receiver.
Figure 19:
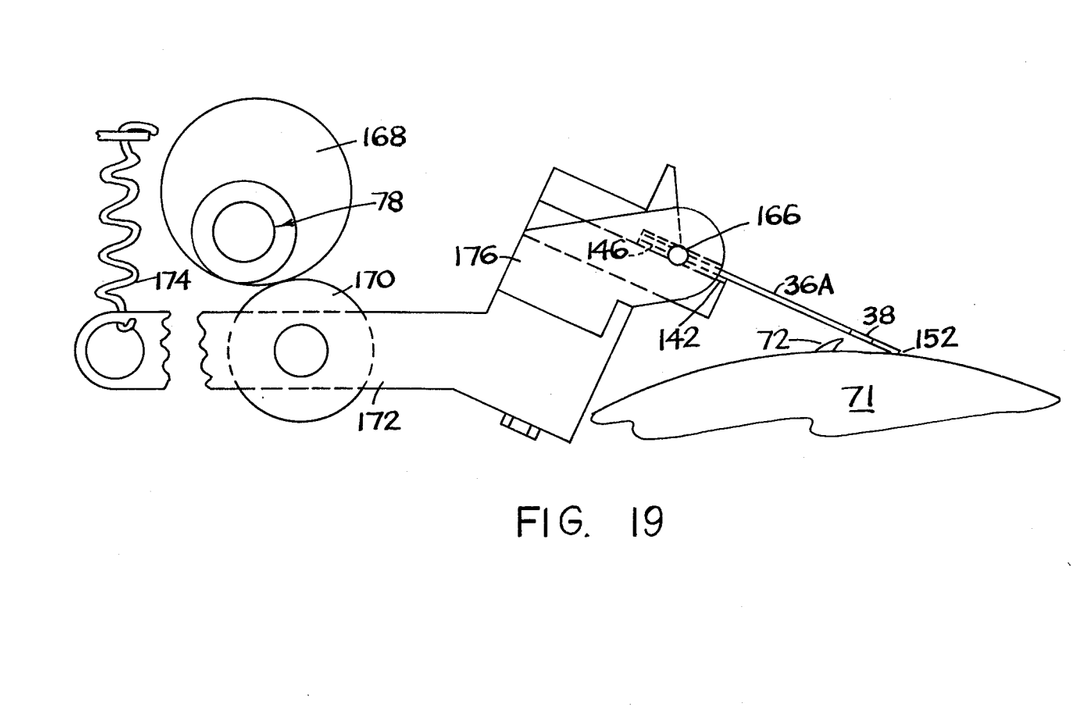
FIG. 19 is a fragmentary, side elevational view of the machine illustrating the tilting of the ticket receiver and ticket for engagement by the transport wheel drive lugs.

FIGS. 16-21 illustrate a modified ticket feed arrangement. The tickets 36 are stacked in superposed relation upon rods 58 of the wicket, as in the embodiment of FIGS. 1-15. The lowermost ticket 36A, FIG. 16, is in the "as loaded" position, and is supported adjacent one side upon an angled ledge member 140 and adjacent the opposite side by two narrow, widely spaced rear supports 142. Immediately to the rear of and spaced above each rear support 142 is a companion part 144 that cooperates with a support 142 to form a receiver slot 146. The distance between each bottom support 142 and the companion part 144 is only slightly greater than the thickness of an average ticket. FIGS. 17 and 18 illustrate the lowermost ticket 36A in the first stages of the feed cycle as it is being advanced into the slots 146 by the blade 148 of the pusher mechanism 140. In FIG. 19, the blade 148 has engaged the front edge 152 of the ticket 36A and pushed the rear edge 154 completely into the receiver slots 146 and the front edge 152 beyond the ledge member 140.

The crank shaft 78 in the embodiment of FIGS. 1-15 also is used for displacing the pusher blade 148 of the embodiment of FIGS. 16-21. The pusher assembly 150 includes a generally U-shaped apparatus 156 having spaced, generally horizontally disposed legs 158 with the pusher blade 148 secured to the outer ends thereof. The base portion 160 of the U-shaped apparatus is attached by fasteners 162 to a coupling member 164 which engages the eccentric portion of the drive shaft 78, such that the pusher blade 148 reciprocates in response to rotation of the eccentric shaft.

Once the lower ticket 36A has been urged into the slots 146 by the blade 148, rear supports 142 and companion parts 144, tilt downwardly, pivoting about shaft 166 as shown by FIG. 19, approximately 15° to position the forward portion of the ticket 36A adjacent the transport wheel such that the ticket drive lugs 72 engage the ticket openings 38. As the ticket is pulled from slots 146 by lugs 72, continued displacement past the angled ledge member 140 forces the ticket properly onto the lugs due to the location and wedge-shaped configuration at the support member 140. The tilting action of the ticket in the slots 146 of supports 142, 144 is accomplished by a cam 168 secured for rotation with the eccentric shaft 78. A cam follower 170 mounted upon an arm 172 engages the cam 168 due to the spring 174. The arm 172 is secured to a support member 176 which has secured thereto members 142, 144 and in turn, is pivotable supported upon side walls 92, 94 by shafts 166. The spring 174, which urges the follower 170 into engagement with cam 168, has one end secured to the arm 172 and the opposite end secured to a member 178 fixed to wall 94. The cam 168 is mounted 78 that drives the pusher assembly 150, and the phase relationship is such that the pusher blade has retracted beyond the front edge of the ticket stack so that a new ticket can move into the feed position as the ticket 36A tilted downwardly, as in FIG. 19 is carried away by the transport wheel.

In the embodiment of FIGS. 16-21, the lugs 72 of the transport wheel have been redesigned as thin spikes with a forward incline angle of approximately 20° and rounded back surfaces. The root width of each tooth corresponds to the diameter of the drive openings 38 in the tickets.

Both the pusher assembly 150 and cam 168 operate on a one stroke per ticket basis. In this embodiment, one revolution of the transport wheel equals eight revolutions of the drive shaft 78.

Figure 20:
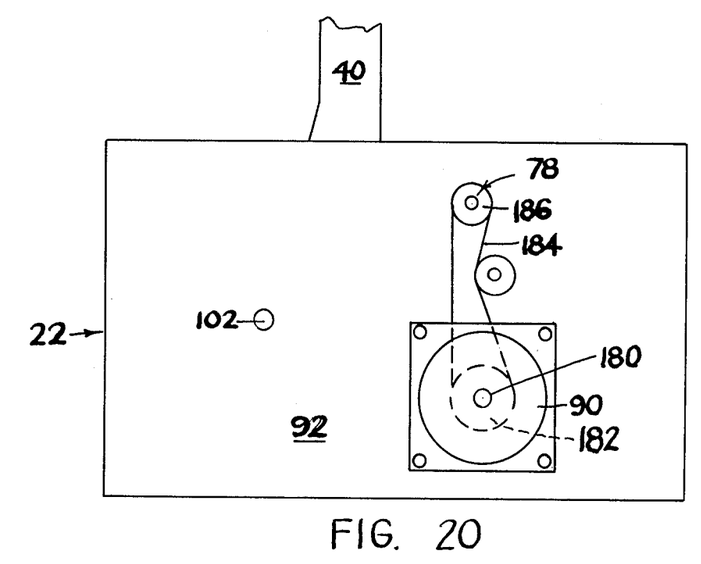
FIG. 20 is a fragmentary, elevational view of one side of the ticket reader having the modified ticket feed arrangement.
Figure 21:
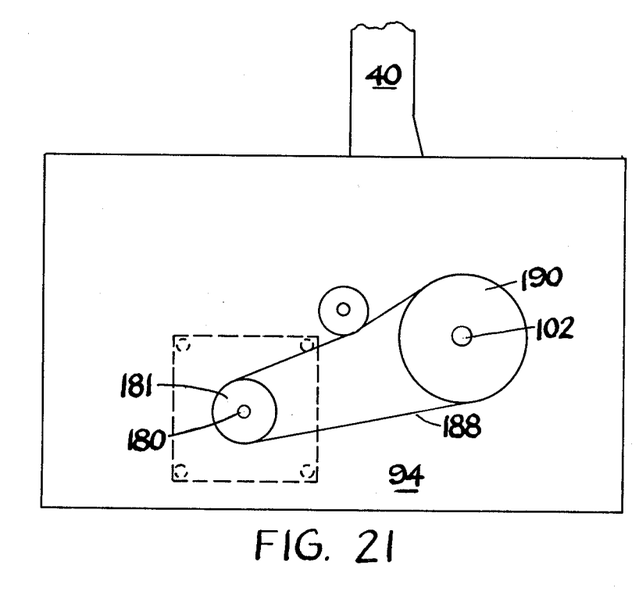
FIG. 21 is a fragmentary, elevational view of the opposite side of the reader.

The belt drives for the ticket reader of this embodiment also have been simplified. The drive motor 90, supported upon side wall 92 drives a shaft 180 and a gear 182. The shaft 78, in turn, is driven by a bolt 184 and gear 186 from the gear 182. The flanges 71 of the transport wheel are driven from motor 90 through shaft 180, gear 181, belt 188, gear 190 and shaft 102.

The ticket data sensing apparatus, not shown in FIGS. 16-21, operates in the same manner as that described in the embodiment of FIGS. 1-15.

What is claimed is:

1. In a portable, lightweight system for sequentially feeding and sensing a plurality of records having specific data encoded thereon from a supply means retaining a plurality of encoded records in stacked relation; transport means for continuously removing records sequentially from said supply means and conveying the records along a predetermined path, said transport means including feed means for removing a record from said supply means and conveying the record to an escapement means, said escapement means including means for slidably receiving a record as it is advanced in a first direction into said receiving means by said feed means, said feed means including a blade member for displacing a record from said supply means and into said receiving means, rotatable transport wheel means rotatable in a direction generally opposite to said first direction and having at least one drive member for engaging the record and conveying the record to a data sensing station, said escapement means including a displaceable member for directing the record towards said transport wheel for engagement by said drive member, and means for driving said feed means, said transport wheel and said escapement means directing member in timed relation to convey the record from the supply means to said drive member.

2. In a system for sequentially feeding and sensing a plurality of records as recited in claim 1, said feed means including a driven shaft having said blade member extending outwardly therefrom for removing an encoded record from the plurality of stacked, encoded records with each revolution of said driven shaft and for advancing the records in a first direction.

3. In a system for sequentially feeding and sensing a plurality of records as recited in claim 1, wherein said transport wheel means comprises at least one flange having a series of equally spaced drive members positioned around the periphery thereof, each member being positioned for engaging and transporting a record along said prescribed path to a sensing station.

4. In a system for sequentially feeding and sensing a plurality of records as recited in claim 1, said driving member operating continuously to sequentially advance simultaneously the plurality of records along said predetermined path.

5. In a system for sequentially feeding and sensing a plurality of records as recited in claim 1, sensing control means for sequentially reading encoded data on said records and providing data output pulses representative of said encoded data, said sensing control means including an electronic read head and means for timing the movement of said records past said read head.

6. In a system for sequentially feeding and sensing a plurality of records having specific data encoded thereon; means for supporting a series of records in superposed, stacked relation, means for engaging and advancing the lowermost record of said series of records in a first direction relative to said stacked series of records, means for displacing said receiving means and record therein to a prescribed position, means for sensing data encoded upon the records, and transport means for engaging the record in said prescribed position and transporting the record along a prescribed path to said data sensing means.

7. In a system as recited in claim 6, said means for supporting a series of records including spaced support ledges supporting selected edges of the lowermost ticket, said receiving means including cooperating elements defining record receiving slots, said advancing means including a displaceable blade-like member having a thickness approximately equal to the thickness of a record.

8. In a system as recited in claim 7, said means for displacing said record receiving means to said prescribed position including cam means for tilting said cooperating elements defining said slots about an axis.

9. In a system as recited in claim 7, said sensing means including control means for sequentially reading data on said records and providing data output pulses representative of the data, said control means including an electronic read head and means for timing the movement of said records past said read head.

* * * * *